United States Patent [19]

Delrieu

[11] Patent Number: 5,738,464
[45] Date of Patent: Apr. 14, 1998

[54] CURVATURE LIMITER FOR A PIPE RUNNING IN A MARINE ENVIRONMENT

[75] Inventor: Jean-Luc Delrieu, Pau, France

[73] Assignee: Elf Aquitaine Production, France

[21] Appl. No.: 710,942

[22] Filed: Sep. 24, 1996

[30] Foreign Application Priority Data

Sep. 27, 1995 [FR] France ................... 95 11329

[51] Int. Cl.⁶ .................. E02B 17/00; F16L 1/12
[52] U.S. Cl. .................. 405/202; 405/195.1; 405/169; 403/335
[58] Field of Search .................. 405/169, 170, 405/171, 202, 216; 166/242.1, 242.2, 242.6, 243; 285/45, 67, 383; 403/205, 293, 335

[56] References Cited

U.S. PATENT DOCUMENTS

| | | | |
|---|---|---|---|
| 2,901,890 | 9/1959 | Hutchison | 405/224 |
| 3,273,346 | 9/1966 | Delaruelle et al. | 405/171 |
| 3,689,114 | 9/1972 | Meserole | 285/373 |
| 3,791,442 | 2/1974 | Watkins | 166/0.5 |
| 4,004,531 | 1/1977 | Mott | 114/256 |
| 4,423,983 | 1/1984 | Dadiras et al. | 405/195 |
| 5,046,896 | 9/1991 | Cole | 405/195 |

FOREIGN PATENT DOCUMENTS

| | | | |
|---|---|---|---|
| 2 729 432 | 7/1996 | France. | |
| 94/24456 | 10/1994 | WIPO | F16F 1/38 |

Primary Examiner—Tamara L. Graysay
Assistant Examiner—Gary S. Hartmann
Attorney, Agent, or Firm—Bacon & Thomas

[57] ABSTRACT

Curvature limiter for a pipe running in a marine environment, more specifically a pipe riser (12) running between a sub-sea oil well (14) and a support (10) on the surface (16) of the sea. The curvature limiter (26) comprises at least two elements (28) which are substantially tubular and arranged around the pipe riser (12), these elements being joined together by an interconnection (30) which serves to limit the angular separation between the elements.

3 Claims, 3 Drawing Sheets

CURVATURE LIMITER FOR A PIPE RUNNING IN A MARINE ENVIRONMENT

BACKGROUND OF THE INVENTION

1. Field of the Invention

The present invention relates to a curvature limiter for a pipe running in a marine environment and, more specifically, for a pipe riser, which pipe runs between a sub-sea oil well and a support on the surface of the sea.

2. Description of Related Art

To allow drilling and subsequent exploitation of a sub-sea oil well, a pipe riser, more commonly termed "riser", is installed between the upper end of the well, situated on the bottom of the sea, and a support on the surface of the sea, typically a barge or a platform. This pipe riser, which is made of steel and has a diameter of between 22 cm and 40 cm, defines a volume which is isolated from the sea, inside which the operations of drilling and of exploiting the well may take place.

The operations of drilling and exploitation offshore take place in increasingly deep waters, for example water from 400 m to 2000 m deep, which means that a pipe riser of an equivalent length is required. This pipe riser has to be kept under axial tension to prevent it from kinking and dropping to the bottom of the sea under the effect of its own weight.

However, the effects of the current and of the swell cause relative motion between the floating support and the lower end of the pipe riser at the bottom of the sea. Also, the pipe riser does not run vertically between the bottom and the surface but adopts a sagging shape, inclined slightly with respect to the vertical, because it is subjected to the effects of its own weight, its tension and the strength of the current.

The diameter of the pipe is very small compared with its long length. What is more, the flexural inertia of the pipe in practice plays no part in determining its curvature. The pipe has rather to be considered as behaving like a taut wire which is subjected to lateral forces per unit length.

French Patent No. 94 00465 describes a pipe-riser tensioning assembly comprising an elastic pipe arranged around the pipe riser and running between an intermediate point on the pipe and the support on the surface and additionally comprising buoyancy means arranged inside the elastic pipe.

The use of this type of tensioner has the drawback that the set of forces acting on the pipe riser causes substantial curvature or sagging at an intermediate point adjacent to the lower end of the elastic pipe.

The use at sea of a drilling or production barge requires the upper end of the pipe riser to be mounted so that it can slide, in order to allow relative motion of the pipe with respect to the barge when the latter moves with the swell. It would be advantageous to provide a pipe riser which has substantially the shape of a S, the upper end of which is fixed to the barge. The elasticity of the S-shaped pipe would allow the latter to absorb the rise and fall of the barge. Unfortunately, the use of such an installation was not hitherto possible if a current, even a moderate current, was present, because the current acting on the pipe tended to deform it beyond the acceptable limit.

SUMMARY OF THE INVENTION

The subject of the present invention is therefore a curvature limiter intended to be mounted on a pipe running in a marine environment, for example, a pipe riser, which is reliable and of simple construction.

The curvature limiter according to the invention is characterized in that it comprises at least two substantially tubular elements arranged around the pipe riser, these elements being joined together by an interconnection which serves to limit the angular separation between the elements.

The advantages, together with the operation of the present invention, will become clearer from reading the following description, given without implied limitation, with reference to the attached drawings.

BRIEF DESCRIPTION OF THE FIGURES OF DRAWINGS

DETAILED DESCRIPTION OF THE INVENTION

Figure 1:
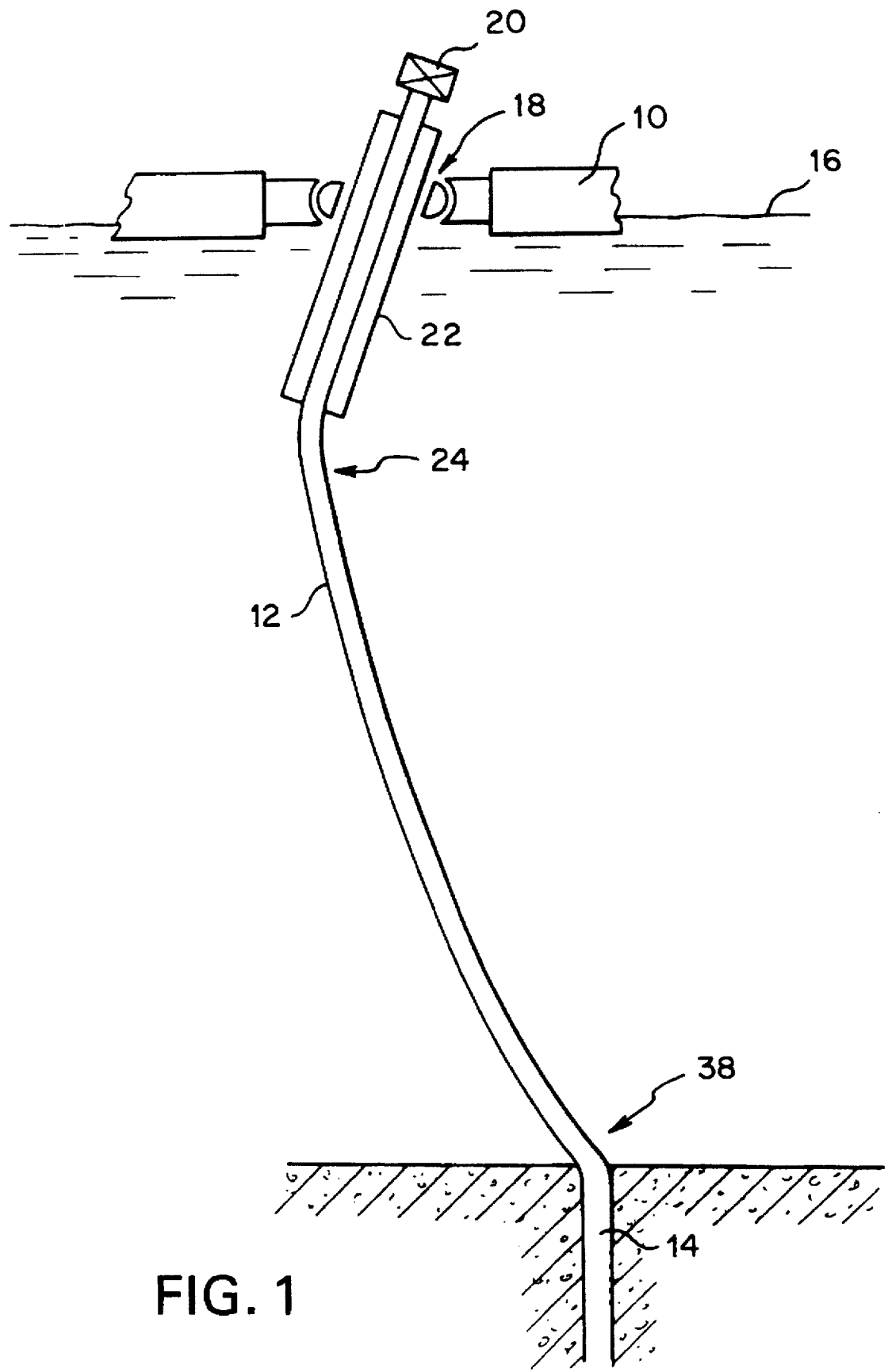
FIG. 1 is a diagrammatic view in longitudinal section of a pipe riser according to the prior art.

FIG. 1 partially represents a floating support which, in the example illustrated, is a barge 10. A pipe riser 12 running from an oil well 14 at the bottom of the sea to the surface 16 is received in the barge by means of a universal joint or ball joint 18 which allows relative vertical motion between the barge and the pipe 12. At its upper end, the pipe riser 12 is equipped with a wellhead assembly 20. A tensioning assembly for the pipe riser 12 comprises a pipe 22 arranged around the pipe riser on its upper part. The lower end of the pipe 22 is fixed to the pipe riser 12, its upper end being mounted on the barge 10.

As was described earlier, the forces acting on the pipe riser 12 cause the latter to curve or to sag in the region of the pipe immediately below the pipe 22, this region being represented in general by 24.

Figures 2, 2A:
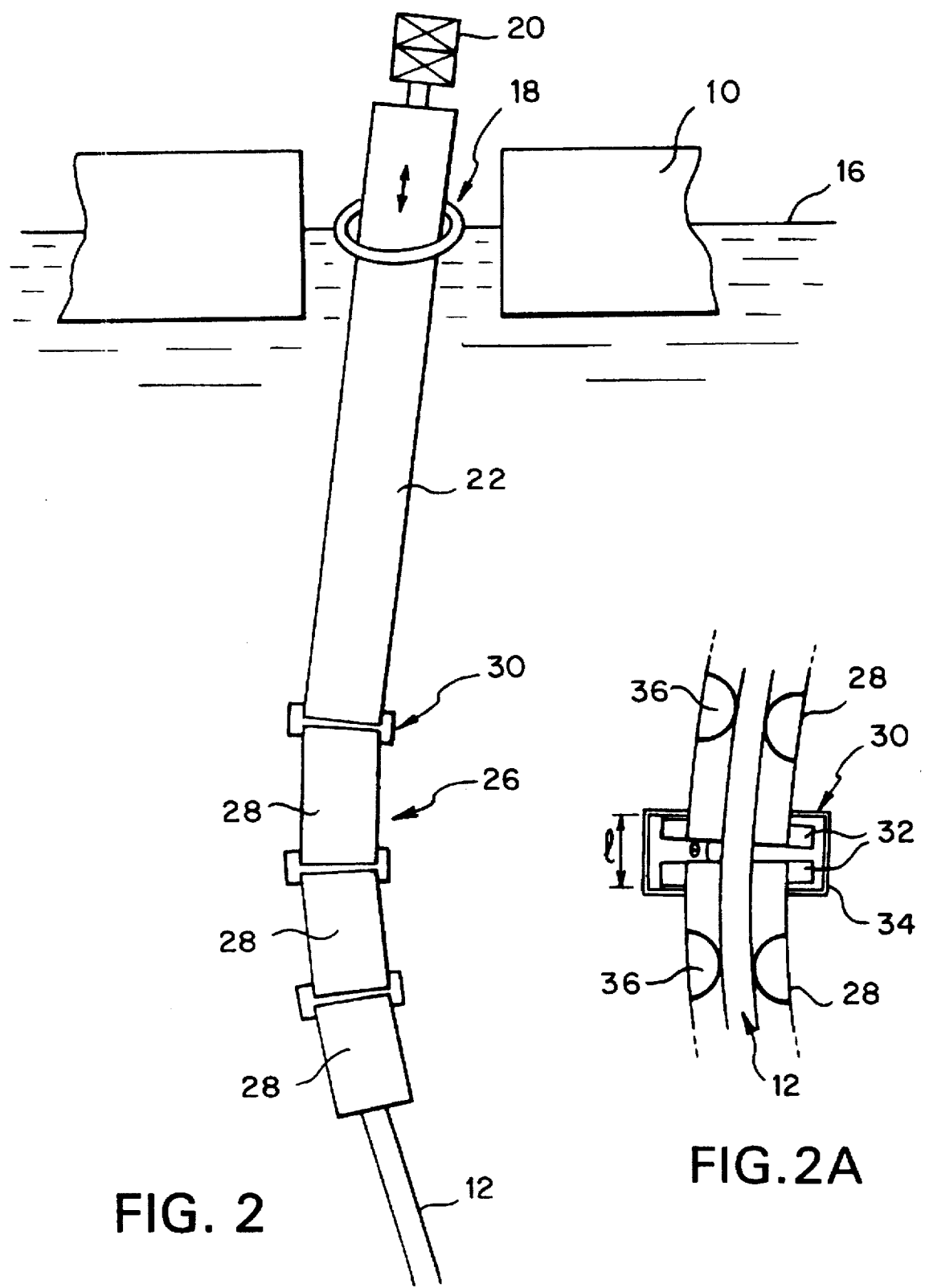
FIG. 2 is a similar view of a pipe riser equipped with a curvature limiter according to the invention.
FIG. 2A is a detail view of an element of FIG. 2.

In FIG. 2, the elements which correspond to those in FIG. 1 bear the same reference numerals. According to the invention, the pipe riser 12 is equipped with a curvature limiter represented in general by 26. The curvature limiter 26 is formed of several substantially tubular elements 28, three of them in the example illustrated, arranged end-to-end around the pipe riser 12. Each element 28 is joined to the adjacent element by an interconnection 30 which serves to limit the angular separation between the two elements. For this purpose, each end of an element 28 has a radial flange 32 on its outer wall. An annular collar 34, arranged around a pair of adjacent flanges, forms the interconnection, while limiting the separation between the flanges 32. The axial length 1 (see FIG. 2A) of the collar 34 limits the angular separation between two elements, in a predetermined manner. As a preference, the angle θ defined between the opposing faces of two elements 28 lies between 1° and 4° and, as a preference, is 2° for elements 5 m long. An interconnection 30 of the same type is also arranged between the elastic pipe 22 and the first element 28. As a preference, each element 28 is equipped with centering devices 36.

The installation of a curvature limiter at the lower end of the pipe riser in the region 38 adjacent to the outlet from the well 14 may also be envisaged (see FIG. 1).

Figure 3:
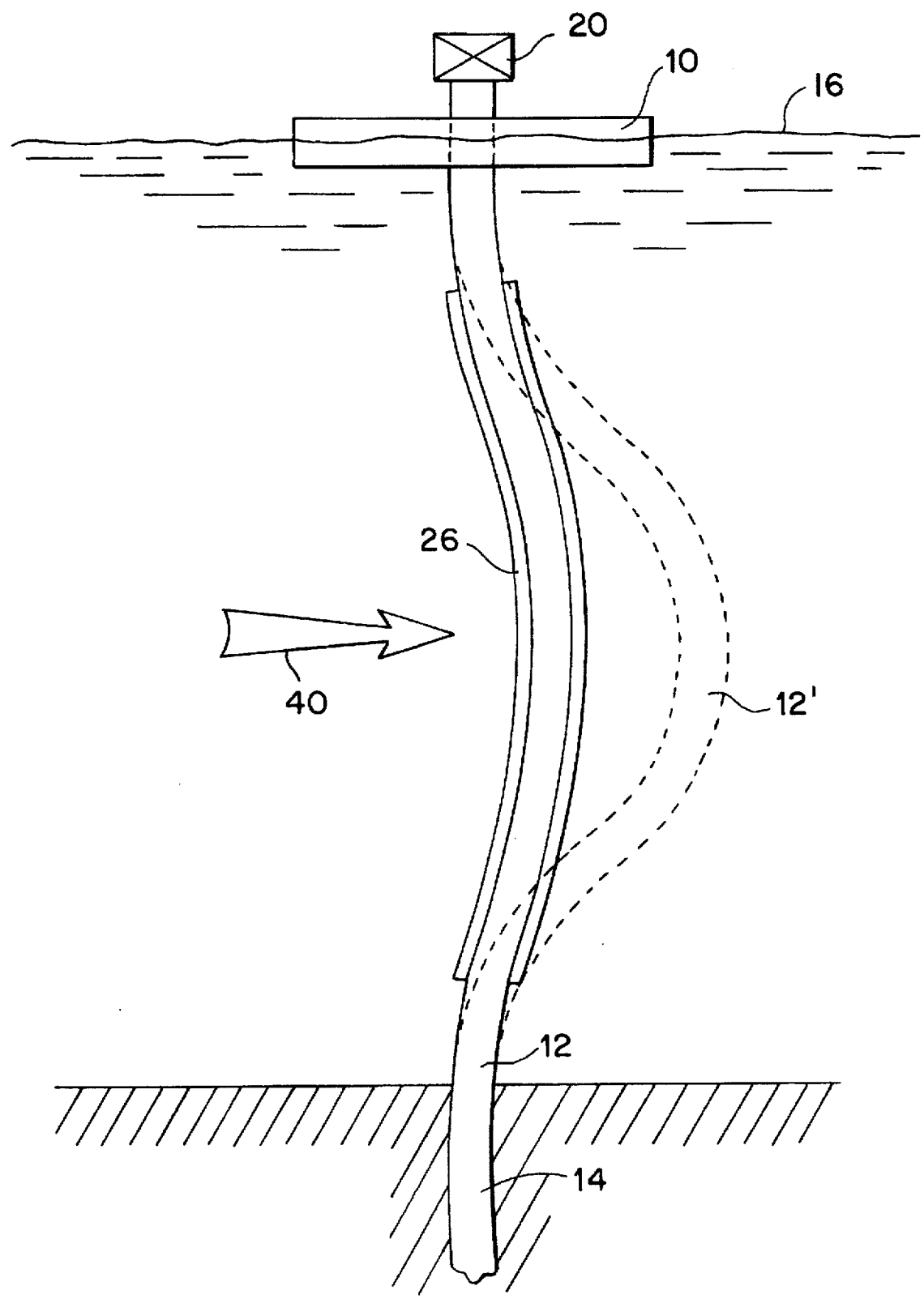
FIG. 3 is a diagrammatic view in longitudinal section of a second type of pipe riser equipped with a curvature limiter according to the invention.

FIG. 3 represents another embodiment of the invention. The elements which are common to the embodiments described earlier bear the same reference numerals. In this embodiment, the upper end of the pipe riser 12, equipped with the wellhead assembly 20, is mounted rigidly on the barge 10. In this example, the pipe riser 12 has a substantially S shape, which gives the barge 10 the freedom to rise and fall. However, as was described earlier, the effect of the tidal current, which moves in the direction of the arrow 40, would tend to deform the pipe riser 12 towards the position 12 represented in dotted line in the figure, in which position the pipe is deformed beyond acceptable limits. According to the invention, in order to alleviate this drawback, a curvature limiter 26 is arranged around the pipe riser, over a great part of its length. As a preference, the limiter runs over at leat 50% of the length of the pipe 12, symmetrically relative to the middle of the pipe.

The curvature limiter according to the invention may be used with any type of pipe running in a marine environment and liable to be subjected to excessive curvature. For example, the invention may find an application in pipeline-laying ramps, more commonly termed "stingers", which are ballastable supports arranged, under water, behind a pipeline-laying barge.

I claim:

1. Curvature limiter for a pipe running in a marine environment comprising at least two elements which are substantially tubular and arranged around the pipe, these elements being joined together by an interconnection which serves to limit the angle of separation between the elements, wherein each end of an element has a radial flange projecting from its outer wall, the interconnection comprising an annular collar arranged around a pair of adjacent flanges placed on two consecutive elements in order to limit the angle of separation between the flanges.

2. Curvature limiter according to claim 1, wherein the axial length of the collar limits the angular separation between the two elements to an angle θ of between 1° and 4°.

3. Curvature limiter according to claim 1, for a pipe riser equipped with a tensioning assembly comprising a pipe arranged around the pipe riser, wherein one of the elements is connected to the end of the pipe by an interconnection.

* * * * *